(12) United States Patent
Zhao et al.

(10) Patent No.: US 12,339,352 B2
(45) Date of Patent: Jun. 24, 2025

(54) ELECTROMAGNETIC IMAGING DEVICE FOR ACTIVE MICROWAVE AND MILLIMETER WAVE SECURITY INSPECTION APPARATUS

(71) Applicants: Tsinghua University, Beijing (CN); Nuctech Company Limited, Beijing (CN)

(72) Inventors: Ziran Zhao, Beijing (CN); Yan You, Beijing (CN); Yuanjing Li, Beijing (CN); Xuming Ma, Beijing (CN); Jian Wu, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 1008 days.

(21) Appl. No.: 17/309,915

(22) PCT Filed: Oct. 10, 2019

(86) PCT No.: PCT/CN2019/110381
§ 371 (c)(1),
(2) Date: Jan. 14, 2022

(87) PCT Pub. No.: WO2020/134335
PCT Pub. Date: Jul. 2, 2020

(65) Prior Publication Data
US 2022/0221576 A1    Jul. 14, 2022

(30) Foreign Application Priority Data
Dec. 29, 2018 (CN) .......................... 201811654199.4

(51) Int. Cl.
*G01S 13/90* (2006.01)
*G01S 7/20* (2006.01)
(Continued)

(52) U.S. Cl.
CPC ............ *G01S 13/9021* (2019.05); *G01S 7/20* (2013.01); *G01S 7/282* (2013.01); *G01V 3/12* (2013.01)

(58) Field of Classification Search
None
See application file for complete search history.

(56) References Cited

U.S. PATENT DOCUMENTS

| 5,557,283 A * | 9/1996 | Sheen .................... G01V 8/005 |
| | | 342/179 |
| 2007/0263907 A1* | 11/2007 | McMakin .............. G06V 40/25 |
| | | 382/107 |

(Continued)

FOREIGN PATENT DOCUMENTS

| CN | 103616667 A | 3/2014 |
| CN | 104808201 A | 7/2015 |

(Continued)

OTHER PUBLICATIONS

CN104808201 translation (Year: 2015).*
(Continued)

*Primary Examiner* — Whitney Moore
(74) *Attorney, Agent, or Firm* — Schwegman Lundberg & Woessner, P.A.

(57) ABSTRACT

The present disclosure provides an electromagnetic imaging device for an active microwave and millimeter wave security inspection apparatus, including: a two-dimensional multiple-input multiple-output array panel including at least one sub-array, wherein each sub-array includes a plurality of transmitting antennas arranged linearly and a plurality of receiving antennas arranged linearly, the plurality of transmitting antennas arranged linearly being intersected with the (Continued)

plurality of receiving antennas arranged linearly; a signal processing device; a display device; and a ranging radar. In each sub-array, a midpoint of a connection line between each transmitting antenna and a corresponding receiving antenna serves as a virtual equivalent phase center of a pair of the each transmitting antenna and the corresponding receiving antenna, and the plurality of transmitting antennas and the plurality of receiving antennas are arranged to generate an equivalent phase center web. A distance between adjacent transmitting antennas or a distance between adjacent receiving antennas is equal to a wavelength of the electromagnetic wave with the specific frequency, and a distance between adjacent equivalent phase centers in the equivalent phase center web generated ranges from 30% to 70% of the wavelength of the electromagnetic wave with the specific frequency.

20 Claims, 8 Drawing Sheets

(51) Int. Cl.
    *G01S 7/282*    (2006.01)
    *G01V 3/12*    (2006.01)

(56) References Cited

U.S. PATENT DOCUMENTS

2014/0066757 A1* 3/2014 Chayat ............... H01Q 13/085
    343/893
2014/0320331 A1* 10/2014 Fernandes ............ G01S 13/887
    342/22

FOREIGN PATENT DOCUMENTS

| | | |
|---|---|---|
| CN | 106093898 A | 11/2016 |
| CN | 206209131 U | 5/2017 |
| CN | 108761452 A | 11/2018 |
| CN | 109358372 A | 2/2019 |
| CN | 109444968 A | 3/2019 |
| CN | 109799538 A | 5/2019 |
| CN | 109828241 A | 5/2019 |
| CN | 209342935 U | 9/2019 |
| WO | WO-2007054685 A2 | 5/2007 |

OTHER PUBLICATIONS

CN206209131 translation (Year: 2017).*
"International Application Serial No. PCT/CN2019/110381, International Search Report mailed Jan. 8, 2020", w/ English Translation, (Jan. 8, 2020), 8 pgs.
"International Application Serial No. PCT/CN2019/110381, Written Opinion mailed Jan. 8, 2020", (Jan. 8, 2020), 5 pgs.

* cited by examiner

ELECTROMAGNETIC IMAGING DEVICE FOR ACTIVE MICROWAVE AND MILLIMETER WAVE SECURITY INSPECTION APPARATUS

This application is a U.S. National Stage Filing under 35 U.S.C. § 371 from International Application No. PCT/CN2019/110381, filed on Oct. 10, 2019, and published as WO2020/134335 on Jul. 2, 2020, which claims the benefit of priority to Chinese patent Application No. CN201811654199.4, filed on Dec. 29, 2018; the benefit of priority of each of which is hereby claimed herein, and which applications and publication are hereby incorporated herein by reference in their entirety.

TECHNICAL FIELD

The present disclosure relates to an electromagnetic imaging device, and in particular to an electromagnetic imaging device for an active microwave and millimeter wave security inspection apparatus, and a movable security inspection apparatus including the electromagnetic imaging device.

BACKGROUND

At present, international public security technologies generally include manual inspection, hand-held metal detectors, metal detector doors, X-ray machines, explosives measurement and detection, liquid detectors, etc.

Manual detection has high accuracy but low efficiency, and an inspected subject is prone to resistance due to physical contact. Hand-held metal detectors and metal detection doors may only operate on metals, and may not detect non-metal dangerous goods. Explosives measurement and detection and liquid detectors both have shortcomings of single function and limited application. X-ray machines may only be used to detect luggage and items or used in special places such as prisons because X-rays have ionization, and it is easy to be questioned by the public in terms of safety. At present, X-ray machines have been officially banned by the national environmental protection department for human security inspections.

A human security inspection apparatus generally includes an X-ray backscatter human imaging device and a millimeter wave human imaging device. The X-ray backscattered human imaging device uses a signal scattered back by X-rays incident on a surface of a human body for imaging.

Therefore, traditional inspection modes such as X-ray machines, metal detectors, or body search cannot be implemented to dynamically interfere with potential dangers and cannot meet current increasingly severe and complex forms of security inspection. Although a passive terahertz human security inspection system is harmless to the human body and may realize real-time imaging, it has a low signal-to-noise ratio of image and a poor penetration so that hidden objects under down jackets and leather jackets may not be detected, and the device has a large size and occupies a large area. A three-dimensional holographic technology-based active millimeter wave security door is also a safe human security inspection apparatus. However, it requires a mechanical scanning device, and the inspected subject needs to stand still at a designated posture in a designated position to cooperate with the security inspection, and an imaging rate is generally 2-3 s/person. Accordingly, it may not realize real-time imaging, and an efficiency of the security inspection is low. In addition, the device occupies a large area to detect an entire human body.

Therefore, security inspection apparatuses in a related art are not suitable for secret security inspections in public places.

SUMMARY

According to an aspect of the present disclosure, there is provided an electromagnetic imaging device for an active microwave and millimeter wave security inspection apparatus, including:

a two-dimensional multiple-input multiple-output array panel including at least one two-dimensional multiple-input multiple-output sub-array, wherein each two-dimensional multiple-input multiple-output sub-array of the at least one two-dimensional multiple-input multiple-output sub-array includes a plurality of transmitting antennas arranged linearly and a plurality of receiving antennas arranged linearly, the plurality of transmitting antennas arranged linearly being intersected with the plurality of receiving antennas arranged linearly, the plurality of transmitting antennas are configured to emit an electromagnetic wave with a specific frequency, and the plurality of receiving antennas are configured to receive an electromagnetic wave reflected from an inspected object;

a signal processing device configured to reconstruct an image of the inspected object based on the electromagnetic wave received by the plurality of receiving antennas:

a display device configured to display the image of the inspected object; and a ranging radar arranged on the two-dimensional multiple-input multiple-output array panel and configured to accurately measure a distance between the inspected object and the electromagnetic imaging device, wherein, in each sub-array, a midpoint of a connection line between each transmitting antenna of the plurality of transmitting antennas and a corresponding receiving antenna of the plurality of receiving antennas serves as a virtual equivalent phase center of a pair of the each transmitting antenna and the corresponding receiving antenna, and the plurality of transmitting antennas and the plurality of receiving antennas are arranged to generate an equivalent phase center web; and wherein a distance between adjacent transmitting antennas of the plurality of transmitting antennas or a distance between adjacent receiving antennas of the plurality of receiving antennas is equal to a wavelength of the electromagnetic wave with the specific frequency, and a distance between adjacent equivalent phase centers in the equivalent phase center web generated ranges from 30% to 70% of the wavelength of the electromagnetic wave with the specific frequency.

According to an exemplary embodiment of the present disclosure, the specific frequency ranges from 10 GHz to 300 GHz, and the electromagnetic wave with the specific frequency is a microwave or a millimeter wave with a frequency of 10 GHZ to 300 GHz.

According to an exemplary embodiment of the present disclosure, in each sub-array, the plurality of transmitting antennas are linearly arranged in two parallel columns, the plurality of receiving antennas are linearly arranged in two parallel rows, and the two columns of transmitting antennas and the two rows of receiving antennas form a rectangular or square sub-array.

According to an exemplary embodiment of the present disclosure, in the each sub-array, the plurality of transmitting antennas are linearly arranged in a row, the plurality of receiving antennas are linearly arranged in a row, and the row of transmitting antennas and the row of receiving antennas are intersected at a midpoint.

According to an exemplary embodiment of the present disclosure, the two-dimensional multiple-input multiple-output array panel includes N*N two-dimensional multiple-input multiple-output sub-arrays or N*M two-dimensional multiple-input multiple-output sub-arrays, where N is a positive integer greater than or equal to 1, M is a positive integer greater than or equal to 1, and N is not equal to M.

According to an exemplary embodiment of the present disclosure, the plurality of transmitting antennas in each two-dimensional multiple-input multiple-output sub-array are configured to sequentially emit the electromagnetic wave with the specific frequency, and the plurality of receiving antennas in the same two-dimensional multiple-input multiple-output sub-array as the plurality of transmitting antennas are configured to receive the electromagnetic wave reflected from the inspected object. In this embodiment, the signal processing device is configured to reconstruct the image of the inspected object based on a holographic reconstruction algorithm.

According to an exemplary embodiment of the present disclosure, all transmitting antennas in the two-dimensional multiple-input multiple-output array panel are configured to sequentially emit the electromagnetic wave with the specific frequency, and all receiving antennas in the two-dimensional multiple-input multiple-output array panel are configured to receive the electromagnetic wave reflected from the inspected object when each transmitting antenna emits the electromagnetic wave with the specific frequency. In this embodiment, the signal processing device is configured to reconstruct the image of the inspected object based on a backward projection algorithm or a holographic reconstruction algorithm.

According to another aspect of the present disclosure, there is provided a movable security inspection apparatus, including: a movable carrier; and the electromagnetic imaging device described above, wherein the electromagnetic imaging device is mounted on the movable carrier, and the two-dimensional multiple-input multiple-output array panel of the electromagnetic imaging device has a length of 10 cm to 100 cm and a width of 10 cm to 100 cm; and wherein the security inspection apparatus is configured to scan a region of the inspected object corresponding to a size of the two-dimensional multiple-input multiple-output array panel when the security inspection apparatus is close to the inspected object.

According to an exemplary embodiment of the present disclosure, the movable carrier includes at least one of a self-propelled device, a hand-held portable device, and a rotatable decoration installed in a public place.

The electromagnetic imaging device according to the present disclosure is provided with the two-dimensional multiple-input multiple-output array panel. The array panel may completely perform electrical scanning without mechanical scanning, so that rapid scanning may be performed and an imaging speed may be increased. There is no artifact superimposition in the image generated by the electromagnetic imaging device, and the image processing speed may be faster. Due to characteristics of rapid scanning and rapid image reconstruction, the electromagnetic imaging device may perform rapid scanning on a moving human body or other objects without the inspected object being stationary. The electromagnetic imaging device according to the present disclosure may be mounted on a movable object or a rotatable object, and does not need to be arranged in an obvious fixed position. Therefore, the electromagnetic imaging device is suitable for being carried or hidden.

DETAILED DESCRIPTION OF EMBODIMENTS

Although the present disclosure allows various modifications and substitutions, its specific embodiments are shown in the drawings by way of example and will be described in detail herein. However, it should be understood that the accompanying drawings and detailed description are not intended to limit the present disclosure to the specific forms disclosed, but on the contrary, they are intended to cover all modifications, equivalents and substitutions falling within the spirit and scope of the present disclosure defined by the appended claims. The drawings are for illustration and are not drawn to scale.

The terms "upper", "lower", "left", "right" and the like are used in the specification not to limit the absolute orientation of the element, but to describe the relative position of the element in the view to help understanding. In the specification, "top side" and "bottom side" refer to the orientation of the upper side and the lower side of an upright object in general. "First" and "second" are not for ordering, but for distinguishing different components.

A number of embodiments according to the present disclosure will be described below with reference to the drawings.

Figure 1:
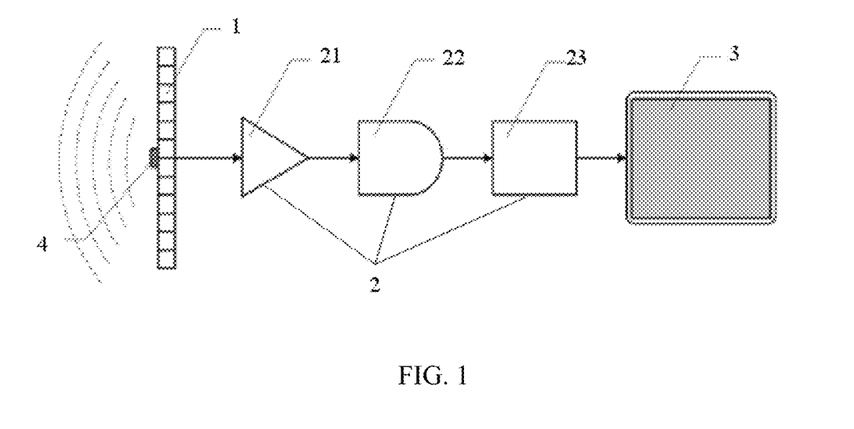
FIG. 1 shows a schematic diagram of an electromagnetic imaging device according to an embodiment of the present disclosure.

FIG. 1 shows an electromagnetic imaging device according to an embodiment of the present disclosure. The electromagnetic imaging device is used for a microwave and millimeter wave-based active security inspection apparatus. The electromagnetic imaging device includes: a two-dimensional multi-input multi-output array panel (2D MIMO array panel) 1, a signal processing device 2, a display device 3 and a ranging radar 4. The two-dimensional multiple-input multiple-output array panel 1 includes at least one two-dimensional multiple-input multiple-output sub-array 11 (shown in FIG. 2). Each two-dimensional multiple-input multiple-output sub-array 11 includes a plurality of transmitting antennas Tx arranged linearly and a plurality of receiving antennas Rx arranged linearly (shown in FIG. 2). The plurality of transmitting antennas arranged linearly are intersected with the plurality of receiving antennas arranged linearly at any angle, preferably 90°. That is, the plurality of transmitting antennas arranged linearly are perpendicular to the plurality of receiving antennas arranged linearly. The plurality of transmitting antennas are configured to emit an electromagnetic wave with a specific frequency, and the plurality of receiving antennas are configured to receive an electromagnetic wave reflected from an inspected object. The signal processing device 2 is configured to reconstruct an image of the inspected object based on the electromagnetic wave received by the plurality of receiving antennas. The display device 3 is configured to display the image of the inspected object and issue an alarm in response to identifying a suspicious item. In each sub-pixel, an equivalent position for transmitting and receiving signals may be represented by a phase center of antennas. The equivalent position is a physical center of two independent antennas or apertures. In the embodiments of the present disclosure, a receiving antenna and a transmitting antenna are arranged not in the same position. Such a system in which the transmitting antenna and the receiving antenna are spatially separated may be simulated by using a virtual system in which a virtual position is added between each pair of the transmitting antenna and the receiving antenna. This position is called an equivalent phase center. In the present disclosure, a midpoint of a connection line between each transmitting antenna of the plurality of transmitting antennas and a corresponding receiving antenna of the plurality of receiving antennas is regarded as a virtual equivalent phase center of a pair of the each transmitting antenna and the corresponding receiving antenna. A distance between adjacent transmitting antennas or a distance between adjacent receiving antennas is equal to a wavelength of the electromagnetic wave with the specific frequency. A distance between adjacent equivalent phase centers ranges from 30% to 70% of the wavelength of the electromagnetic wave with the specific frequency, preferably half the wavelength of the electromagnetic wave with the specific frequency. The ranging radar 4 is arranged on the two-dimensional multiple-input multiple-output array panel and is used to accurately measure a distance between the inspected object and the electromagnetic imaging device.

Figure 2:
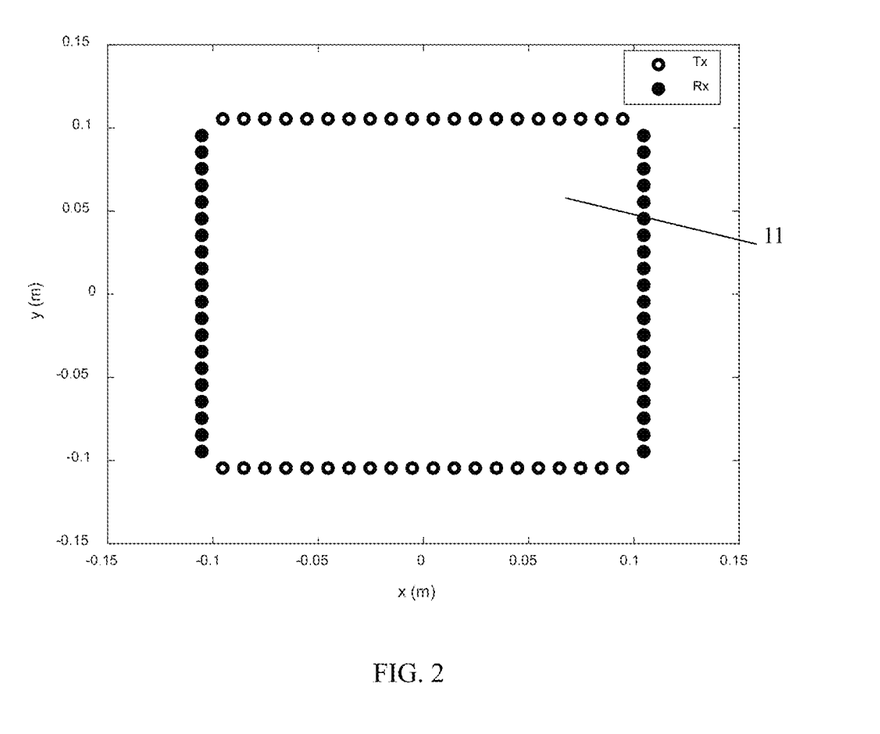
FIG. 2 shows a schematic diagram of an arrangement of transmitting antennas and receiving antennas of a two-dimensional multiple-input multiple-output sub-array according to an embodiment of the present disclosure.
Figure 3:
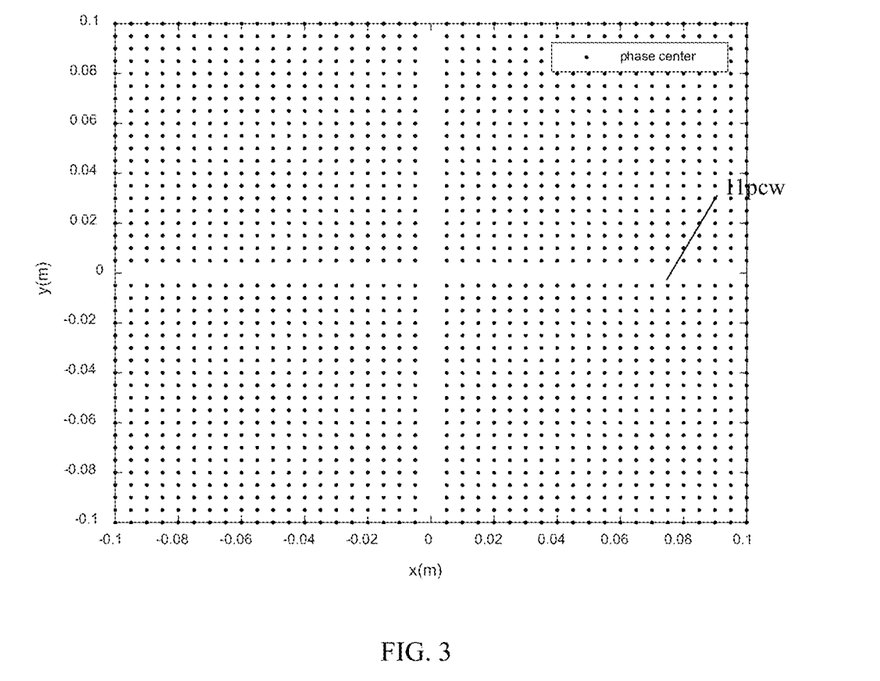
FIG. 3 shows a schematic diagram of an equivalent phase center web generated by the transmitting antennas and the receiving antennas as shown in FIG. 2.

In the present disclosure, the electromagnetic wave used is a microwave or a millimeter wave with a frequency of 10 GHz to 300 GHz. Waves in this band have no ionization damage to the human body and may be used for human security inspection. In the present disclosure, the two-dimensional multiple-input multiple-output array panel 1 is provided, in which the transmitting antennas Tx are configured to emit the electromagnetic wave and the receiving antennas Rx are configured to receive the electromagnetic wave. Therefore, the array panel 1 may completely perform electrical scanning without mechanical scanning, so that rapid scanning may be achieved and an imaging speed may be increased. A pair of a transmitting antenna and a corresponding receiving antenna in the two-dimensional multiple-input multiple-output array panel may generate an equivalent phase center, and echo data collected by the pair of the transmitting antenna and the receiving antenna may be equivalent to an echo collected by a transceiver antenna at the equivalent phase center. The transmitting antennas are arranged at an interval equal to the wavelength of the electromagnetic wave, and the receiving antennas are arranged at an interval equal to the wavelength of the electromagnetic wave. In each sub-array 11 as shown in FIG. 2 included in the two-dimensional multi-input multi-output array panel, the plurality of transmitting antennas Tx and the plurality of receiving antennas Rx may be arranged to generate an equivalent phase center web 11$pcw$ as shown in FIG. 3, in which the interval between adjacent equivalent phase centers is preferably half the wavelength. Therefore, the entire equivalent phase center web is substantially a full array, and a sampling interval of an imaging system used (that is, the interval between the equivalent phase centers) is in the order of $\lambda/2$. Therefore, there is no artifact superimposition in the image generated, and a clear image may be formed, so that a speed of image processing may be improved.

Figure 11:
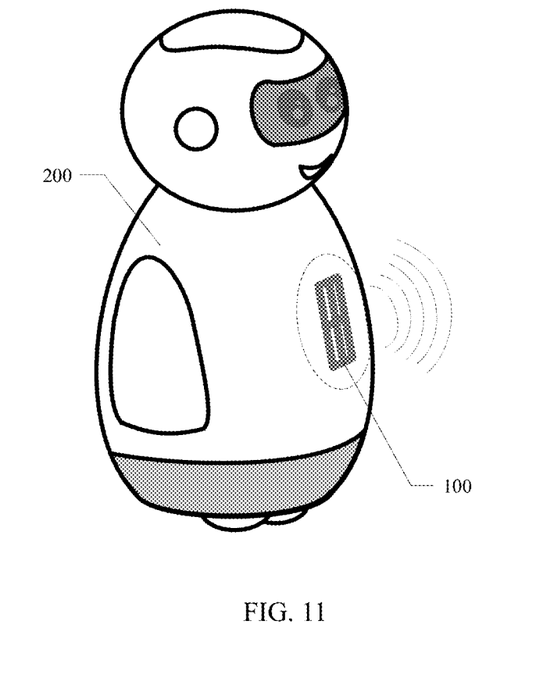
FIG. 11 shows an application scenario of an electromagnetic imaging device according to an embodiment of the present disclosure.
Figure 12:
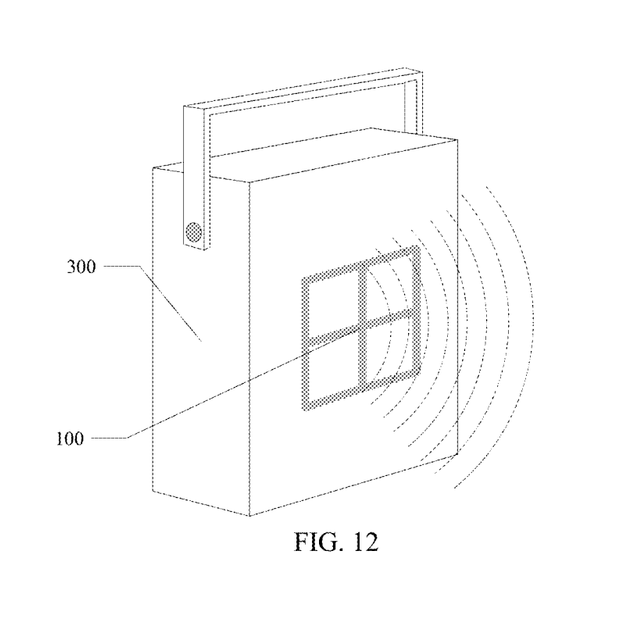
FIG. 12 shows an application scenario of an electromagnetic imaging device according to another embodiment of the present disclosure.
Figure 13:
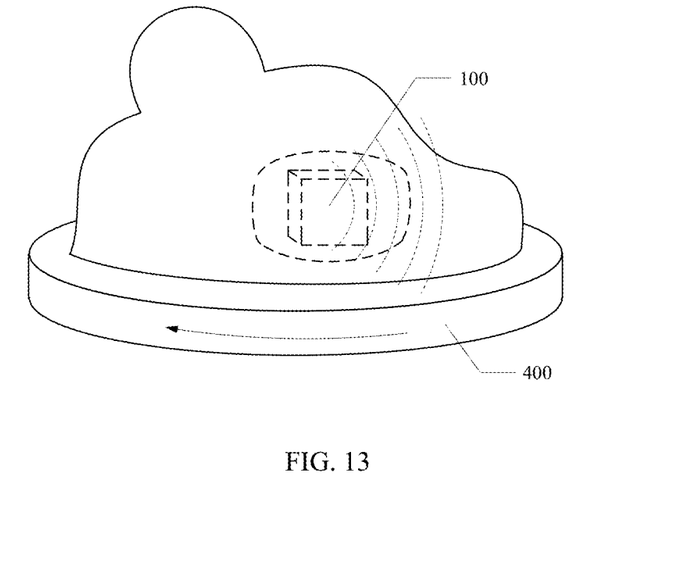
FIG. 13 shows an application scenario of an electromagnetic imaging device according to yet another embodiment of the present disclosure.

Due to characteristics of rapid scanning and rapid image reconstruction, the electromagnetic imaging device according to the present disclosure may perform rapid scanning on a moving human body or other objects without the inspected object being stationary. The electromagnetic imaging device 100 according to the present disclosure may be mounted on a movable object or a rotatable object, and does not need to be arranged in an obvious fixed position. Therefore, the electromagnetic imaging device is suitable for being carried or hidden. As shown in FIG. 11, the electromagnetic imaging device 100 according to the present disclosure may be mounted on a mobile robot 200 that may shuttle or hide in a crowd in a public place, so as to perform the security inspection in the public place. In addition, as shown in FIG. 12, the electromagnetic imaging device 100 according to the present disclosure may be mounted on a portable security inspection device 300 that may be carried by a security inspector. The security inspector may shuttle in a crowd in a public place so that the security inspection may be performed in the public place. In addition, as shown in FIG. 13, the electromagnetic imaging device 100 according to the present disclosure may be mounted on a rotating holder 400. Decorations may be carved on the rotating holder 400 so that the rotating holder 400 may be presented as a decoration in public. The electromagnetic imaging device 100 may be hidden in the decoration so that it is not easy to be found and the security inspection may be performed secretly. Therefore, the electromagnetic imaging device according to the present disclosure may secretly inspect guns, knives, explosives, drugs and other dangerous goods carried by terrorists in concealment, thereby improving safety in the public place.

In the three application scenarios described above, the two-dimensional multiple-input multiple-output array panel of the electromagnetic imaging device has a length of 10 cm to 100 cm and a width of 10 cm to 100 cm. The electromagnetic imaging device may mainly scan a part of the inspected object where dangerous goods are easily hidden, such as a waist of a human body or a handbag.

In an exemplary embodiment of the present disclosure, the signal processing device 2 includes an analog signal processor 21, a digital-to-analog converter (D/A converter) 22, and a digital signal processor 23. The 2D MIMO array panel may convert the microwave and the millimeter wave received from the inspected object into echo data on the equivalent phase center, and transmits the echo data to the analog signal processor 21. The analog signal processor 21 is used to receive an analog signal from the 2D MIMO array panel and transmits the analog signal to the digital-to-analog converter 22. The digital-to-analog converter 22 is used to receive the signal from the analog signal processor 21, perform a digital-to-analog conversion on the signal, and then transmit a converted signal to the digital signal processor 23. The digital signal processor 23 is used to receive information converted by the converter and perform an image reconstruction. An image reconstruction algorithm adopted by the digital signal processor 23 will be described in detail below.

In an exemplary embodiment of the electromagnetic imaging device according to the present disclosure, as shown in FIG. 2, in each sub-array 11, a plurality of transmitting antennas Tx are linearly arranged in two parallel columns, a plurality of receiving antennas Rx are linearly arranged in two parallel rows, and the two columns of transmitting antennas Tx and the two rows of receiving antennas Rx form a rectangular or square sub-array 11. In the exemplary embodiment shown in FIG. 2, a number of the transmitting antennas Tx in each column is equal to that of the receiving antennas Rx in each row, so that a square sub-array 11 is formed. However, in other embodiments, the number of the transmitting antennas in each column may be different from that of the receiving antennas in each row, so that a rectangular sub-array is formed. The square sub-array 11 in FIG. 2 may generate the equivalent phase center web 11pcw as shown in FIG. 3. In the equivalent phase center web 11pcw, except for a cross-shaped blank portion in the middle, the other positions are filled with virtual equivalent phase centers formed by corresponding pairs of transmitting antennas and receiving antennas. In addition, the interval between adjacent equivalent phase centers ($\lambda/2$) is about half the interval between adjacent transmitting antennas or the interval between adjacent receiving antennas (the interval is a wavelength $\lambda$). Therefore, the equivalent phase center web 11pcw is almost a full array, and the sampling interval of the imaging system used (that is, the interval between equivalent phase centers) is on the order of about $\lambda/2$, so that there is no artifact superimposition in the image generated.

Figure 4A:
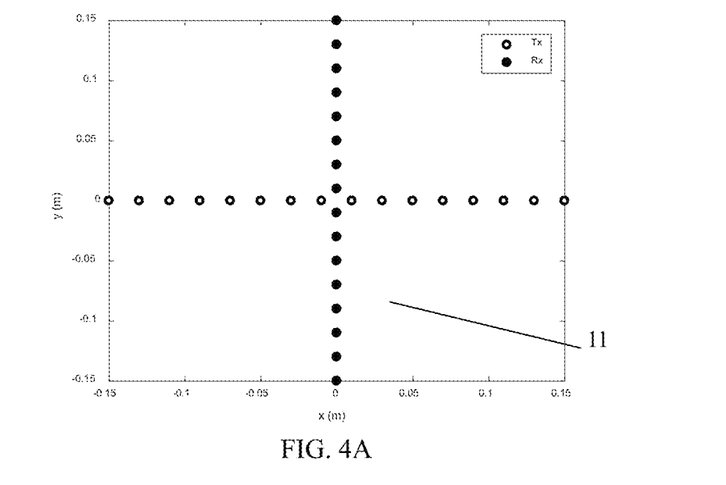
FIG. 4A and FIG. 4B respectively show a schematic diagram of an arrangement of transmitting antennas and receiving antennas of a two-dimensional multiple-input multiple-output sub-array and a schematic diagram of an equivalent phase center web generated according to another embodiment of the present disclosure.
Figure 4B:
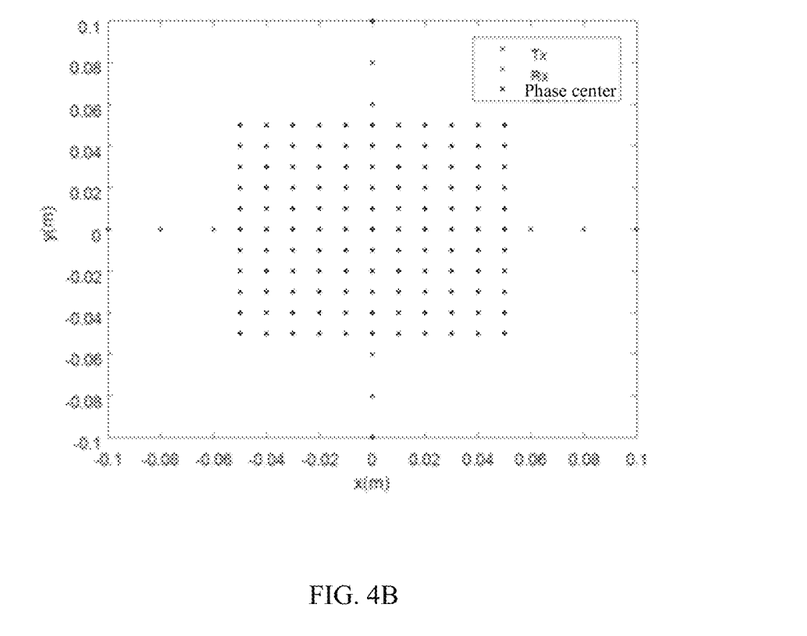
Figure 5A:
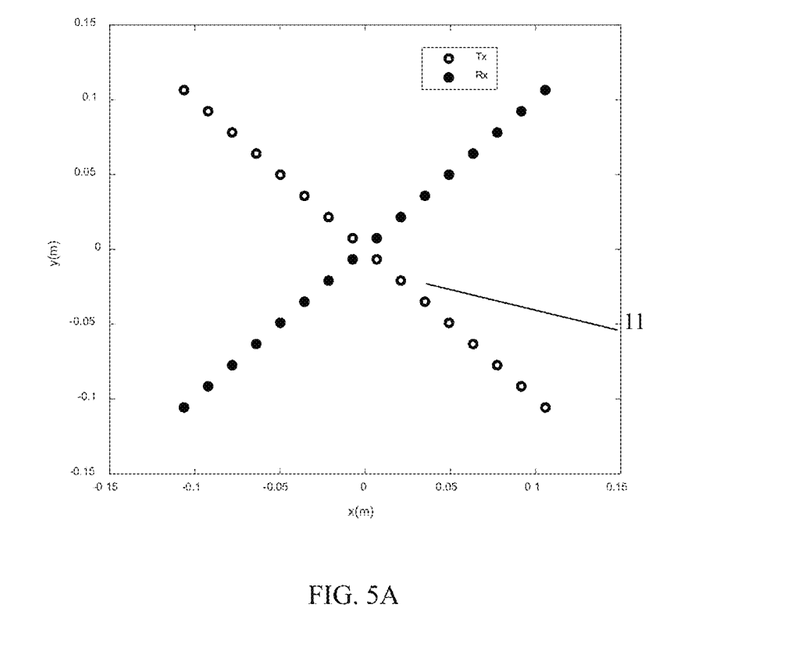
FIG. 5A and FIG. 5B respectively show a schematic diagram of an arrangement of transmitting antennas and receiving antennas of a two-dimensional multiple-input multiple-output sub-array and a schematic diagram of an equivalent phase center web generated according to yet another embodiment of the present disclosure.

In an exemplary embodiment according to the present disclosure, as shown in FIG. 4A and FIG. 5A, in each sub-array, the plurality of transmitting antennas are linearly arranged in a row, and the plurality of receiving antennas are linearly arranged in a row. The row of transmitting antennas are parallel to an edge (for example, an upper edge or a lower edge) of the array panel, the row of receiving antennas are parallel to another edge (for example, a left edge or a right edge) of the array panel, and the row of transmitting antennas and the row of receiving antennas are intersected at a midpoint. The row of transmitting antennas and the row of receiving antennas may be arranged perpendicular to each other as shown in FIG. 4A. In this case, the equivalent phase center web generated is shown in FIG. 4B.

In an embodiment, in the arrangement shown in FIG. 4A, the number of the plurality of transmitting antennas may be the same as that of the plurality of receiving antennas. In this embodiment, in an array formed by four adjacent sub-arrays as shown in FIG. 4A, by respectively intercepting corresponding quarter areas, a square array arrangement as shown in FIG. 2 may be obtained.

Figure 5B:
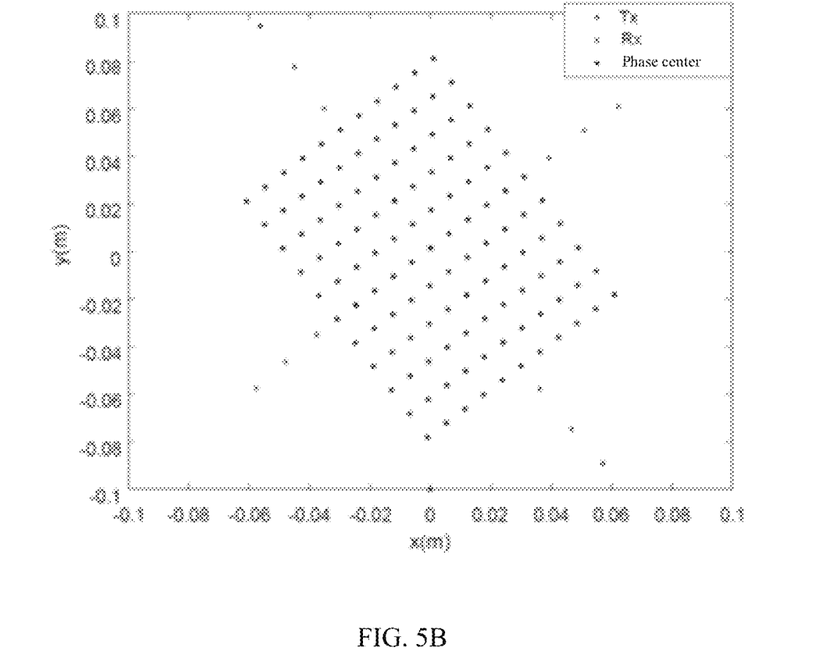

In another embodiment, the row of transmitting antennas and the row of receiving antennas may be intersected at the midpoint as shown in FIG. 5. However, the row of transmitting antennas are not parallel to the edge of the array panel, and the row of receiving antennas are not parallel to the edge of the array panel, either. The row of transmitting antennas and the row of receiving antennas may be intersected at an angle of 90° or at other angles. In this case, the equivalent phase center web generated is shown in FIG. 5B.

In an embodiment, an optional transmitting-receiving array module is a 76-81 GHz chip, which has high integration and low cost. The 2D MIMO array panel 1 may have a size of 20 cm*20 cm and includes one sub-array 11 (as shown in FIG. 2), and the equivalent phase centers generated are shown in FIG. 3. In a case of the 76-81 GHz chip, the array panel includes 96 transmitting antennas and 96 receiving antennas. Those skilled in the art should understand that the number of the receiving antennas, the number of the transmitting antennas and the number of the equivalent phase centers shown in FIG. 2 and FIG. 3 are all illustrative.

Figure 6:
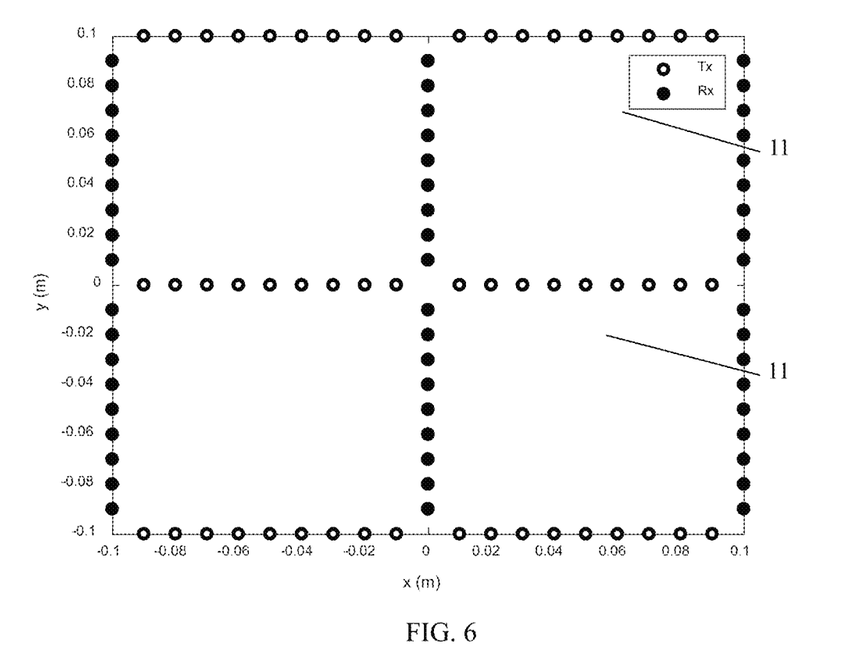
FIG. 6 shows a schematic diagram of a sub-array layout of a two-dimensional multiple-input multiple-output array panel according to an embodiment of the present disclosure.

In an embodiment, the 2D MIMO array panel 1 has a size of 20 cm*20 cm and includes four sub-arrays 11, and each sub-array 11 has a size of 10 cm*10 cm, as shown in FIG. 6. In the case of the 76-81 GHz chip, the array panel includes 141 transmitting antennas and 141 receiving antennas.

Figure 7:
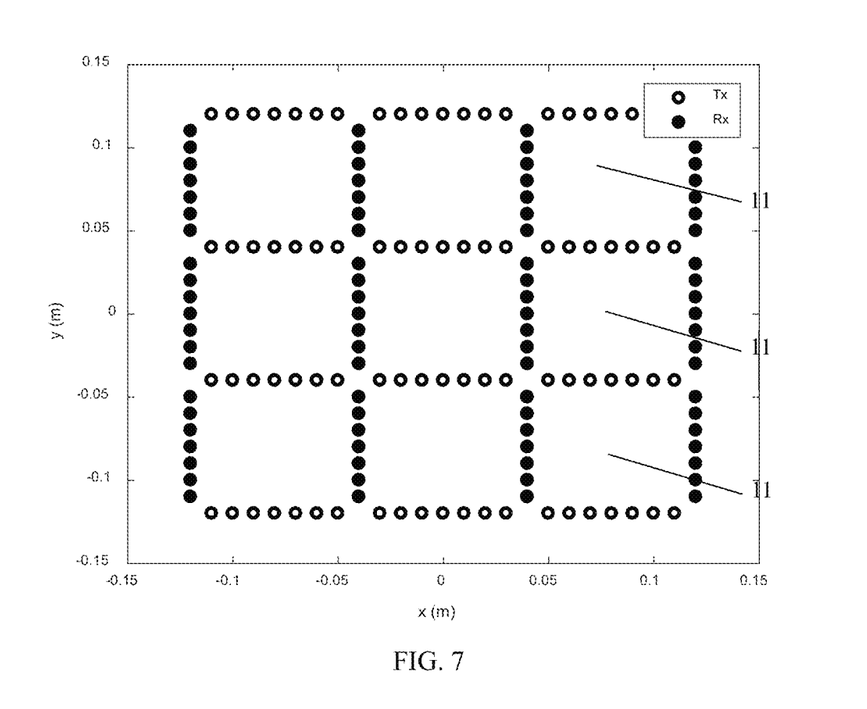
FIG. 7 shows a schematic diagram of a sub-array layout of a two-dimensional multiple-input multiple-output array panel according to an embodiment of the present disclosure.

In an embodiment, the 2D MIMO array panel 1 has a size of 24 cm*24 cm and includes 3*3 sub-arrays 11, and each sub-array 11 has a size of 8 cm*8 cm, as shown in FIG. 7. In the case of the 76-81 GHz chip, the array panel includes 224 transmitting antennas and 224 receiving antennas.

Figure 8:
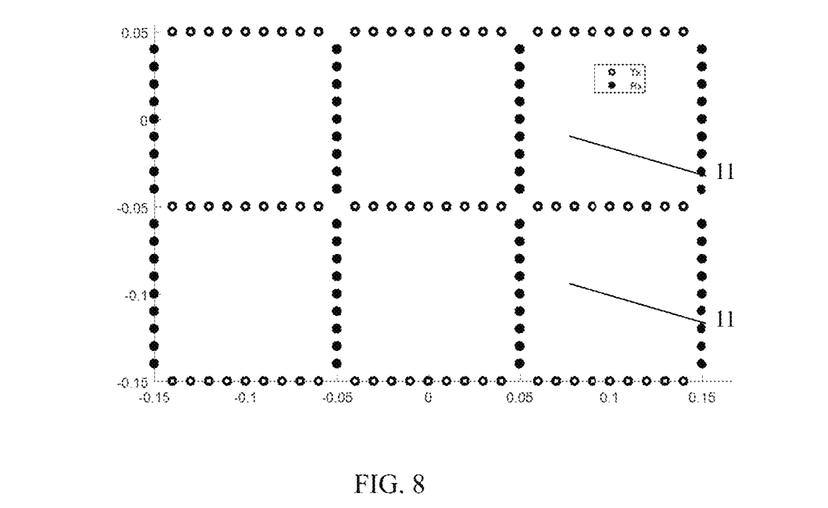
FIG. 8 shows a schematic diagram of a sub-array layout of a two-dimensional multiple-input multiple-output array panel according to an embodiment of the present disclosure.

In an embodiment, the 2D MIMO array panel 1 has a size of 20 cm*30 cm and includes 2*3 sub-arrays 11, as shown in FIG. 8. In the case of the 76-81 GHz chip, the array panel includes 188 transmitting antennas and 213 receiving antennas.

Figure 9:
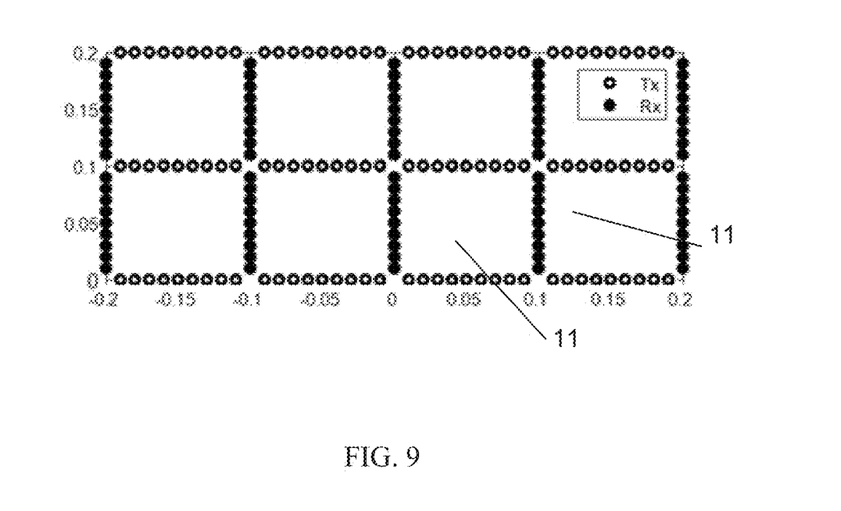
FIG. 9 shows a schematic diagram of a sub-array layout of a two-dimensional multiple-input multiple-output array panel according to an embodiment of the present disclosure.
Figure 10:
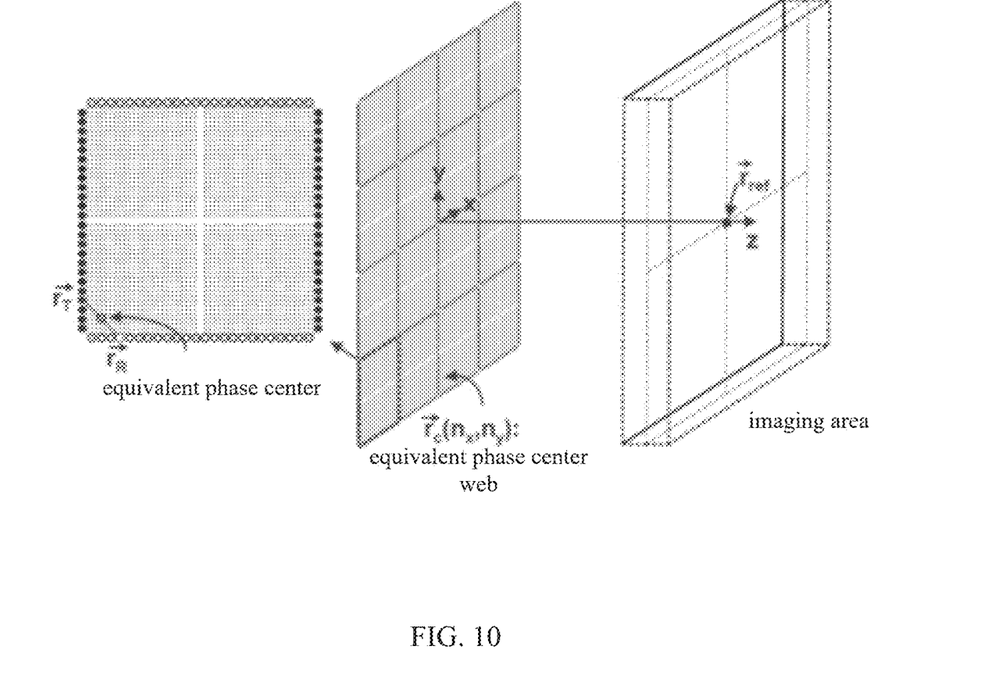
FIG. 10 shows a schematic diagram of a sub-array of a two-dimensional multiple-input multiple-output array panel, an equivalent phase center web generated by the array panel, and an imaging plane of the array panel according to an embodiment of the present disclosure.

In an embodiment, the 2D MIMO array panel 1 has a size of 20 cm*40 cm and includes 2*4 sub-arrays 11, as shown in FIG. 9. In the case of the 76-81 GHz chip, the array panel includes 285 transmitting antennas and 235 receiving antennas.

In the present disclosure, in addition to the 76-81 GHz transceiver array module described above, the transceiver array module may also be a transceiver array with other frequencies in the range of 10 GHz to 300 GHz. The number of the transmitting antennas and the number of the receiving antennas corresponding to different transceiver array sizes and different frequency bands are shown in Table 1. The antenna array may have a side length of 10 cm to 50 cm, preferably 20 cm to 40 cm. Table 1 shows the numbers of transmitting antennas and receiving antennas corresponding to different sub-array sizes and different frequency bands for an area array of 30 cm*30 cm.

TABLE 1

| Frequency/ GHz | Area array size 30 cm*30 cm | |
|---|---|---|
| | Sub-array size 30 cm*30 cm | Sub-array size 15 cm*15 cm |
| 10-20 | 26 + 26 | 36 + 36 |
| 24-30 | 50 + 50 | 72 + 72 |
| 24-40 | 60 + 60 | 87 + 87 |
| 40-60 | 96 + 96 | 141 + 141 |
| 70-80 | 146 + 146 | 216 + 216 |
| 76-81 | 154 + 154 | 228 + 228 |
| 89-99 | 184 + 184 | 273 + 273 |
| 75-110 | 182 + 182 | 270 + 270 |
| 120* | 236 + 236 | 351 + 351 |
| 140 | 276 + 276 | 411 + 411 |
| 170 | 336 + 336 | 501 + 501 |
| 195-205 | 396 + 396 | 591 + 591 |
| 210 | 416 + 416 | 621 + 621 |
| 220 | 436 + 436 | 651 + 651 |
| 250 | 496 + 496 | 741 + 741 |
| 270-300 | 566 + 566 | 846 + 846 |

*A center frequency is shown

In an embodiment according to the present disclosure, the plurality of transmitting antennas Tx are configured to sequentially emit the electromagnetic wave with the specific frequency, and the plurality of receiving antennas Rx located in the same sub-array 11 as the plurality of transmitting antennas are configured to receive the electromagnetic wave reflected from the inspected object when each transmitting antenna emits the electromagnetic wave. After one transmitting antenna emits the electromagnetic wave with the specific frequency, the emission may switch to a next transmitting antenna. The plurality of receiving antennas located in the same sub-array repeatedly perform the receiving process until the scanning of the entire sub-array is completed. After one sub-array 11 performs the scanning, optionally, the scanning may switch to a next sub-array until the scanning of all sub-arrays of the entire array panel is completed, so as to obtain all scattering data of the inspected object at different viewing angles. In such a scanning mode, the holographic reconstruction algorithm described below may be used to perform a real-time image reconstruction.

In an embodiment according to the present disclosure, all transmitting antennas Tx in the two-dimensional multiple-input multiple-output array panel are configured to sequentially emit the electromagnetic wave with the specific frequency, and all receiving antennas Rx in the two-dimensional multiple-input multiple-output array panel are configured to simultaneously receive the electromagnetic wave reflected from the inspected object. That is to say, after one transmitting antenna emits the electromagnetic wave with the specific frequency, the emission switches to the next transmitting antenna, and all the receiving antennas in the array panel repeatedly perform the receiving process, so as to obtain all scattering data of the inspected object at different viewing angles. In this embodiment, if the 2D MIMO array panel 1 only includes one sub-array 11, the holographic reconstruction algorithm described below may still be used for the image reconstruction. In a case that the 2D MIMO array panel 1 includes a plurality of sub-arrays 11, the image reconstruction needs to be performed by using a backward projection algorithm described below.

The holographic reconstruction algorithm may realize a real-time reconstruction of the image of the inspected object. The echo data collected by a pair of transmitting antenna and receiving antenna may be equivalent to the echo collected by a transceiver antenna at the equivalent phase center. The signal processing device may collect the echo data at the equivalent phase center. Assuming that collected reflection data of the inspected object is $s(n_x, n_y)$, the reflection data may be corrected by following equation to obtain a corrected reflection data matrix:

$$\hat{s}(n_x, n_y) = s(n_x, n_y) \frac{R_o(n_x, n_y)}{R_u(n_x, n_y)},$$

$s(n_x, n_y)$ $R_u(n_x, n_y) \quad R_o(n_x, n_y)$ $$R_u(n_x, n_y) = e^{-jk\left|\vec{r}_{T(n_x,n_y)} - \vec{r}_{ref}\right|} e^{-jk\left|\vec{r}_{ref} - \vec{r}_{R(n_x,n_y)}\right|}$$

$$R_o(n_x, n_y) = e^{-j2k\left|\vec{r}_{c(n_x,n_y)} - \vec{r}_{ref}\right|}$$

$\vec{r}_{ref}$ $R_u(n_x, n_y)$ $\vec{r}_{ref}$ $R_o(n_x, n_y)$

Then, a two-dimensional Fourier transform algorithm is used for reconstruction so as to obtain a scattering coefficient of the inspected object.

$$I(x, y) = IFFT_{2D}\left[FFT_{2D}\left[s(n_x, n_y) \frac{R_o(n_x, n_y)}{R_u(n_x, n_y)}\right] \cdot e^{-j\sqrt{4k^2 - k_x^2 - k_y^2} z_0}\right].$$

where $I(x, y)$ represents the scattering coefficient of the inspected object, $z_0$ represents a distance between the 2D MIMO array panel and the inspected object, j represents an imaginary number, k represents a propagation constant, $k_x$ and $k_y$ represents spatial propagation constants, $FFT_{2D}$ represents a two-dimensional Fourier transform, and $IFFT_{2D}$ represents a two-dimensional inverse Fourier transform.

$s(n_x, n_y)$

In addition, the backward projection algorithm may also be used in the present disclosure to reconstruct the image of the inspected object. The backward projection algorithm originated from computer tomography technology, and is an accurate imaging algorithm based on time-domain signal processing. A basic idea is that for each imaging point in the imaging area, a delay between the point and the receiving and transmitting antennas is calculated to coherently superimpose contributions of all echoes thereto, so as to obtain a corresponding pixel value of the point in the image. In this way, coherent superposition processing is performed on the entire imaging area point by point so that an image of the imaging area is obtained. A biggest disadvantage of this algorithm is that each point in the entire imaging area needs to be reconstructed, so that the reconstruction is slow and takes a long time.

However, the backward projection algorithm is naturally easy to implement parallel calculations, and is therefore suitable for a case that the receiving antennas in a plurality of sub-arrays simultaneously receive the electromagnetic wave reflected. Although each point in the entire imaging area needs to be reconstructed, if GPU or FPGA technology is adopted for hardware in a processing system, the time of reconstruction may be greatly reduced, and even the real-time reconstruction may be realized.

$$\hat{O}(x, y, z) = \sum_{\forall k} \sum_{\forall y} \sum_{\forall x_r} \sum_{\forall y_r} \sum_{\forall x_t} s(x_t, y_t, x_r, y_r, k) \cdot$$

$$\exp\left(+jk\sqrt{(x_t-x)^2 + (y_t-y)^2 + (z_a-z)^2}\right) \cdot$$

$$\exp\left(+jk\sqrt{(x_r-x)^2 + (y_r-y)^2 + (z_a-z)^2}\right).$$

$\hat{O}(x, y, z)$ $s(x_t, y_t, x_r, y_r, k)$ $s(x_t, y_t, x_r, y_r, k)$ $$S(x_t, y_t; x_r, y_r; k) = \iint_D \sigma(x_u, y_u)\exp[-jk(R_{t,n} + R_{r,n})]dr$$

The image reconstructed by the reconstruction algorithm may be displayed on the display device 3, and may, combined with a suspicious object alarm algorithm, issue an alarm for a suspicious object.

Although some embodiments of a general concept of the present disclosure have been illustrated and described, it should be understood by those ordinary skilled in the art that these embodiments may be changed without departing from the principle and spirit of the general concept of the present disclosure. The scope of the present disclosure is defined by the claims and their equivalents.

What is claimed is:

1. An electromagnetic imaging device for an active microwave and millimeter wave security inspection apparatus, comprising;
   a two-dimensional multiple-input multiple-output array panel comprising a plurality of two-dimensional multiple-input multiple-output sub-arrays, wherein each two-dimensional multiple-input multiple-output sub-array of the plurality of two-dimensional multiple-input multiple-output sub-array comprises a plurality of transmitting antennas arranged linearly and a plurality of receiving antennas arranged linearly, the plurality of transmitting antennas arranged linearly being intersected with the plurality of receiving antennas arranged linearly, the plurality of transmitting antennas are configured to emit an electromagnetic wave with a specific frequency, and the plurality of receiving antennas are configured to receive an electromagnetic wave reflected from an inspected object;
   a signal processing device configured to reconstruct an image of the inspected object based on the electromagnetic wave received by the plurality of receiving antennas;
   a display device configured to display the image of the inspected object; and
   a ranging radar arranged on the two-dimensional multiple-input multiple-output array panel and configured to accurately measure a distance between the inspected object and the electromagnetic imaging device,
   wherein, in each sub-array, a midpoint of a connection line between each transmitting antenna of the plurality of transmitting antennas and a corresponding receiving antenna of the plurality of receiving antennas serves as a virtual equivalent phase center of a pair of the each transmitting antenna and the corresponding receiving antenna, and the plurality of transmitting antennas and the plurality of receiving antennas are arranged to generate an equivalent phase center web;
   wherein a distance between adjacent transmitting antennas of the plurality of transmitting antennas or a distance between adjacent receiving antennas of the plurality of receiving antennas is equal to a wavelength of the electromagnetic wave with the specific frequency, and a distance between adjacent equivalent phase centers in the equivalent phase center web generated ranges from 30% to 70% of the wavelength of the electromagnetic wave with the specific frequency; and
   wherein the two-dimensional multiple-input multiple-output array panel has a shape of rectangle, and each sub-array comprises a row of transmitting antennas arranged in a first diagonal direction of the two-dimensional multiple-input multiple-output array panel and a row of receiving antennas arranged in a second diagonal direction of the two-dimensional multiple-input multiple-output array panel, and the row of transmitting antennas intersects with the row of receiving antennas;
   wherein the plurality of two-dimensional multiple-input multiple-output sub-arrays are arranged in a non-overlapping array.

2. The electromagnetic imaging device of claim 1, wherein the specific frequency ranges from 10 GHz to 300 GHz, and the electromagnetic wave with the specific frequency is a microwave or a millimeter wave with a frequency of 10 GHZ to 300 GHz.

3. The electromagnetic imaging device of claim 1, wherein in the each sub-array, the plurality of transmitting antennas are linearly arranged in two parallel columns, the plurality of receiving antennas are linearly arranged in two parallel rows, and the two columns of transmitting antennas and the two rows of receiving antennas form a rectangular or square sub-array.

4. The electromagnetic imaging device of claim 3, wherein the two-dimensional multiple-input multiple-output array panel comprises N*N two-dimensional multiple-input multiple-output sub-arrays or N*M two-dimensional multiple-input multiple-output sub-arrays, where N is a positive integer greater than or equal to 1, M is a positive integer greater than or equal to 1, and N is not equal to M.

5. The electromagnetic imaging device of claim 3, wherein the plurality of transmitting antennas in the each two-dimensional multiple-input multiple-output sub-array are configured to sequentially emit the electromagnetic wave with the specific frequency, and the plurality of receiving antennas located in the same two-dimensional multiple-input multiple-output sub-array as the plurality of transmitting antennas are configured to receive the electromagnetic wave reflected from the inspected object.

6. The electromagnetic imaging device of claim 3, wherein all transmitting antennas in the two-dimensional multiple-input multiple-output array panel are configured to sequentially emit the electromagnetic wave with the specific frequency, and all receiving antennas located in the plurality of two-dimensional multiple-input multiple-output sub-arrays of the two-dimensional multiple-input multiple-output array panel are configured to receive the electromagnetic wave reflected from the inspected object when each transmitting antenna emits the electromagnetic wave with the specific frequency.

7. The electromagnetic imaging device of claim 1, wherein in the each sub-array, the plurality of transmitting antennas are linearly arranged in a row, the plurality of receiving antennas are linearly arranged in a row, and the row of transmitting antennas and the row of receiving antennas being intersected at a midpoint.

8. The electromagnetic imaging device of claim 7, wherein the two-dimensional multiple-input multiple-output array panel comprises N*N two-dimensional multiple-input multiple-output sub-arrays or N*M two-dimensional multiple-input multiple-output sub-arrays, where N is a positive integer greater than or equal to 1, M is a positive integer greater than or equal to 1, and N is not equal to M.

9. The electromagnetic imaging device of claim 7, wherein the plurality of transmitting antennas in the each two-dimensional multiple-input multiple-output sub-array are configured to sequentially emit the electromagnetic wave with the specific frequency, and the plurality of receiving antennas located in the same two-dimensional multiple-input multiple-output sub-array as the plurality of transmitting antennas are configured to receive the electromagnetic wave reflected from the inspected object.

10. The electromagnetic imaging device of claim 7, wherein all transmitting antennas in the two-dimensional multiple-input multiple-output array panel are configured to sequentially emit the electromagnetic wave with the specific frequency, and all receiving antennas located in the plurality of two-dimensional multiple-input multiple-output sub-arrays of the two-dimensional multiple-input multiple-output array panel are configured to receive the electromagnetic wave reflected from the inspected object when each transmitting antenna emits the electromagnetic wave with the specific frequency.

11. The electromagnetic imaging device of claim 1, wherein the two-dimensional multiple-input multiple-output array panel comprises N*N two-dimensional multiple-input multiple-output sub-arrays or N*M two-dimensional multiple-input multiple-output sub-arrays, where N is a positive integer greater than or equal to 1, M is a positive integer greater than or equal to 1, and N is not equal to M.

12. The electromagnetic imaging device of claim 11, wherein the plurality of transmitting antennas in the each two-dimensional multiple-input multiple-output sub-array are configured to sequentially emit the electromagnetic wave with the specific frequency, and the plurality of receiving antennas located in the same two-dimensional multiple-input multiple-output sub-array as the plurality of transmitting antennas are configured to receive the electromagnetic wave reflected from the inspected object.

13. The electromagnetic imaging device of claim 11, wherein all transmitting antennas in the two-dimensional multiple-input multiple-output array panel are configured to sequentially emit the electromagnetic wave with the specific frequency, and all receiving antennas located in the plurality of two-dimensional multiple-input multiple-output sub-arrays of the two-dimensional multiple-input multiple-output array panel are configured to receive the electromagnetic wave reflected from the inspected object when each transmitting antenna emits the electromagnetic wave with the specific frequency.

14. The electromagnetic imaging device of claim 1, wherein the plurality of transmitting antennas in the each two-dimensional multiple-input multiple-output sub-array are configured to sequentially emit the electromagnetic wave with the specific frequency, and the plurality of receiving antennas located in the same two-dimensional multiple-input multiple-output sub-array as the plurality of transmitting antennas are configured to receive the electromagnetic wave reflected from the inspected object.

15. The electromagnetic imaging device of claim 14, wherein the signal processing device is configured to reconstruct the image of the inspected object based on a holographic reconstruction algorithm.

16. The electromagnetic imaging device of claim 1, wherein all transmitting antennas in the two-dimensional multiple-input multiple-output array panel are configured to sequentially emit the electromagnetic wave with the specific frequency, and all receiving antennas located in the plurality of two-dimensional multiple-input multiple-output sub-arrays of the two-dimensional multiple-input multiple-output array panel are configured to receive the electromagnetic wave reflected from the inspected object when each transmitting antenna emits the electromagnetic wave with the specific frequency.

17. The electromagnetic imaging device of claim 16, wherein the signal processing device is configured to reconstruct the image of the inspected object based on a backward projection algorithm.

18. The electromagnetic imaging device of claim 16, wherein the signal processing device is configured to reconstruct the image of the inspected object based on a holographic reconstruction algorithm.

19. A movable security inspection apparatus, comprising:
a movable carrier, and
the electromagnetic imaging device of claim 1, wherein the electromagnetic imaging device is mounted on the movable carrier,
wherein the two-dimensional multiple-input multiple-output array panel of the electromagnetic imaging device has a length of 10 cm to 100 cm and a width of 10 cm to 100 cm; and
wherein the security inspection apparatus is configured to scan a region of the inspected object corresponding to a size of the two-dimensional multiple-input multiple-output array panel when the security inspection apparatus is close to the inspected object.

20. The security inspection apparatus of claim 19, wherein the movable carrier comprises at least one of a self-propelled device, a hand-held portable device, and a rotatable decoration installed in a public place.

* * * * *